United States Patent Office 3,498,899
Patented Mar. 3, 1970

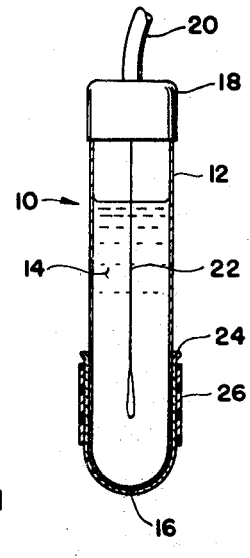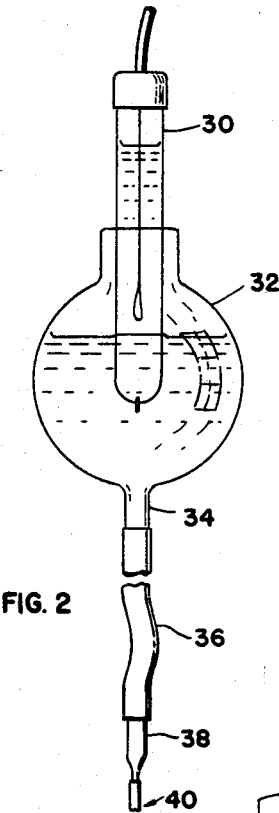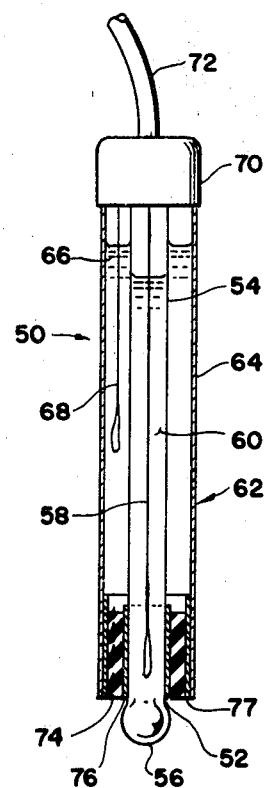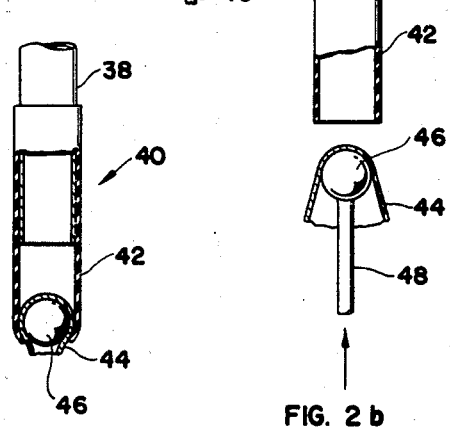

3,498,899
ELECTROCHEMICAL ELECTRODE ASSEMBLY
John A. R. Kater, Diamond Bar, and John E. Leonard, Fullerton, Calif., assignors to Beckman Instruments, Inc., a corporation of California
Filed June 18, 1965, Ser. No. 465,128
Int. Cl. B01k 3/10
U.S. Cl. 204—195       2 Claims

ABSTRACT OF THE DISCLOSURE

An electrochemical reference electrode for use in ion potential measurements of solutions. The liquid junction of the electrode is provided by a semipermeable membrane, such as cellophane or other hydrophilic membrane material whose permeability to liquid and ions is based upon diffusion. The salt bridge solution of the electrode is a strong, equitransferent salt solution so that when the electrode contacts a test solution the liquid junction is formed within the semipermeable membrane.

---

This invention relates generally to an electrochemical electrode assembly and, in particular, to a liquid junction structure of a salt bridge tube such as is used in reference electrodes for ion potential measurements in solutions or in electrodes used for making D.C. potential measurements of biological media.

In making measurements of the ion concentration of solutions, a reference electrode is commonly employed in conjunction with a sensing electrode, such as a glass electrode, with both electrodes immersed in the sample solution. The potential difference between the two electrodes is a function of the concentration of a specific ion in the solution. A typical example is the conventional pH meter used for measuring hydrogen ion concentration in solutions.

A reference electrode ordinarily comprises an internal half cell supported in a tube containing a salt solution, the tube of salt solution being known as a salt bridge. Electrical connection between the salt solution and the sample or test solution is made by liquid flow through a suitably formed aperture or passage in the tube, generally referred to as a leak structure or liquid junction structure. Examples of conventional leak structures which permit the flow of salt solution from a reference electrode to the sample are porous ceramic or Carborundum frits, an annular space around an inert wire sealed in the salt bridge tube, and a small bundle of asbestos fibers sealed in the wall of the tube. Sometimes the entire unit consisting of the internal half cell, the tube, the salt solution and the leak structure is referred to as a half cell; however, for the present specification, the entire unit will be referred to as a reference electrode.

Biological fluids, such as blood, serum and plasma, and other viscous liquids, such as molasses, clay slurries and gelatin mixtures, may at times plug or coat the leak structure of conventional reference electrodes, thereby preventing the flow of the salt solution of the reference electrode to the sample media. Consequently, the electrical connection between the two solutions ceases. What is needed, therefore, is a means for providing a liquid junction whose permeability to liquid and ions is based upon diffusion, not liquid flow, and which is not subject materially to plugging or clogging by biological fluids or other viscous liquids. Although the concept of a diffusion liquid junction has been described in the literature for over seventy years, a practical structure for the formation of such a junction had not yet been achieved.

It is, therefore, the principal object of the present invention to provide an electrochemical electrode assembly having a liquid junction structure whose permeability to liquid and ions is based upon diffusion, rather than on the flow of liquid.

Another object of the invention is to provide an electrochemical electrode assembly having a liquid junction which is difficult to obstruct by coating or plugging when in contact with viscous liquids or biological fluids, has very low resistance, is inexpensive to manufacture, has high stability, and is readily renewable.

According to the principal aspect of the present invention, there is provided an electrochemical electrode assembly including a tube formed of nonconductive material containing a salt bridge solution with an internal half cell immersed in the solution and having a liquid junction structure formed by a semi-permeable membrane closing an opening in the salt bridge tube. Electrolytic contact between the salt bridge solution in the tube and the sample solution contacted by the electrochemical electrode assembly is established by diffusion of the ions of the two solutions into the membrane without actual flow of liquid therethrough. Because the junction of the two solutions takes place within the body of the membrane, rather than at the tip of a leak structure by mixing of a flowing salt bridge solution with the sample as in conventional reference electrodes, the stability of the membrane junction is much less affected by flow of the sample solution than is the leak structure. It has also been discovered that semi-permeable membranes are difficult to obstruct by coating or plugging by viscous liquids such as blood, thus overcoming an undesirable characteristic of conventional leak structures.

Other objects, aspects and advantages will become apparent from the following description taken in connection with the accompanying drawing wherein:

FIG. 1 is an elevational view, partly in section, of a reference electrode incorporating a liquid junction in accordance with the invention;

FIG. 2 is an elevational view, on reduced scale, of a modified form of a reference electrode of the invention;

FIG. 2a is a fragmentary view, partly in section, of the lower portion of the assembly illustrated in FIG. 2;

FIG. 2b shows the method of forming the liquid junction illustrated in FIG. 2a; and FIG. 3 is an elevational view, partly in section, of a combination sensing-reference electrode incorporating the novel liquid junction structure of the present invention.

Referring now to the drawing in detail, there is illustrated in FIG. 1 one embodiment of the electrochemical electrode assembly of the invention, referred to generally by numeral 10, which incorporates the novel liquid junction structure of the invention. The electrode assembly 10 is similar to a conventional reference electrode in that it includes a glass salt bridge tube 12 for containing a salt bridge solution 14 and has an opening 16 at the lower end thereof through which ionic communication with the sample solution is provided. The top of the tube 12 is closed by a cap 18 having a cable 20 attached to an internal half cell 22 immersed in the salt bridge solution 14. The internal half cell 22 is shown as being a silver wire coated with silver chloride, but may also take the form of a calomel half cell or other conventional half cells including a metal and a sparingly soluble salt of said metal. The cable 20 has a connector at its end, not shown, which is adapted for connection to a pH meter in a known manner.

In contrast to the conventional reference electrode in which ionic communication between salt bridge solution 14 and the sample is provided by flow of the solution 14 through a leak structure such as opening 16, in accordance with the present invention, ionic communication is provided through a semipermeable membrane. In FIG. 1, such a membrane 24 is retained over the opening 16 by means of a plastic sleeve 26. The term "semi-permeable" membrane as used in the specification and claims refers to a hydrophilic membrane whose permeability to liquid and small ions is based upon diffusion, rather than by flow of liquid. Examples of such membranes are cellophane, collodion, which is a nitro cellulose membrane, cellulose acetate, protein membranes, such as sheep gut or other animal tissues, and microporous polyvinyl chloride. The above membranes are nonpermeable to and inert toward such large ions and particles as protein molecules and blood cells, besides other viscous liquids. Therefore reference electrodes incorporating such membranes as diffusion barriers are highly desirable for use in measuring the ion concentration of biological fluids such as blood. It should be understood that other semipermeable membranes than those mentioned above fall within the scope of the invention if they have the above described characteristics.

Although the electrode assembly illustrated in FIG. 1 shows the membrane 24 covering an opening 16, it should be understood that the membrane may be disposed over a leak structure of a conventional reference electrode with the advantages of the diffusion barrier provided by the membrane being achieved. Therefore, conventional reference electrodes on the market today may be readily adapted for measuring the pH of blood or other viscous solutions by merely covering the leak structure therein with a semi-permeable membrane. It is, therefore, to be understood that the term "opening" in the claims refers not only to an opening as shown at 16 in FIG. 1 but also to minute leak paths provided through porous plugs, asbestos fibers or other conventional leak structures, and that the opening 16 in FIG. 1 symbolizes such conventional leak structures.

A leak structure of a conventional reference electrode may also be modified to incorporate a semi-permeable membrane by impregnating the leak structure with the membrane material. For example, a linen thread leak structure e.g., has been impregnated with semi-permeable membrane material by contacting a solution of nitro cellulose (colodion) in alcohol and ether with the end of the thread. The solution filled in interstices of the thread by capillary action and, when the thread dried, it was fully impregnated with collodion. A leak structure may also be impregnated by filling the structure, such as a porous ceramic plug, with acid and forcing a solution of cellulose xanthate into the plug which reacts with the acid therein to regenerate cellulose.

Another embodiment of the electrode assembly of the invention is shown in FIG. 2. This assembly includes a conventional reference electrode 30 having its lower end mounted in a glass chamber 32 filled with a salt bridge solution such as saturated potassium chloride, which is a strong, equitransferent salt solution of the type utilized in conventional reference electrodes. The chamber 32 has a port 34 at its lower end to which there is connected an elongated flexible tube 36 formed of a nonconductive material such as silicone rubber. A small glass probe or tube 38 is mounted in the lower end of the flexible tube 36. At the end of the glass probe 38 there is provided a liquid junction structure referred to generally as numeral 40 incorporating a diffusion barrier as best seen in FIG. 2a. The liquid junction structure 40 comprises an additional silicone rubber sleeve 44 sealed to the end of the glass probe 38 and a piece of semi-permeable membrane material 44 secured in the outer end of the sleeve 42 by means of a glass ball or bead 46. The membrane 44 may be mounted in the sleeve 42 by disposing the membrane over the ball 46 as shown in FIG. 2b, and forcing the covered ball into the end of the sleeve 42 by means of a rod 48. In this arrangement, the membrane 44 covers a substantial portion of the ball 46 and is clamped between the ball and the elastic rubber sleeve 42. This liquid junction structure is easy and inexpensive to manufacture and, when incorporated in the assembly shown in FIG. 2, provides a useful instrument for making reference contact with a sample media at relatively remote points such as is required in making pH measurements in living bodies. The assembly in FIG. 2 not only is useful as a reference electrode for making measurements of the ionic concentrations of fluids, but also may be used for making D.C. potental measurements of biological media.

An apparatus as disclosed in FIG. 2 utilizing cellophane as the semi-permeable membrane 44 has been used in the measurement of the pH of blood with the result that the liquid junction provided by the membrane came to equilibrium rapidly and was very stable and reproducible, with no clogging of the membrane occurring by the blood. The membrane junction also had an exceptionally low D.C. electrical resistance, between about 1,000 and 1,500 ohms. By comparison, the typical asbestos fiber or palladium annulus leak structure has a resistance of between 5,000 and 15,000 ohms. Cellulose acetate, sheep gut and micro-porous polyvinyl chloride have also been successfully used as diffusion barriers in reference electrodes.

The semi-permeable membrane junction of the invention may also be incoporated in a combination sensing-reference electrode. As seen in FIG. 3, such a combination electrode 50 includes a sensing electrode 52, shown as a typical glass electrode having a glass stem 54 terminating in an ion sensitive barrier 56. An internal half cell 58 is positioned in the sensing electrode 52 for contact with a salt bridge solution 60. The reference electrode portion of the combination electrode, referred to by numeral 62, comprises a second glass tube 64 which surrounds the stem 54 of the glass electrode and is separated therefrom to provide an annular reservoir for containing a salt bridge solution 66. An internal half cell 68 is immersed in the salt solution 66. A cap 70 closes the upper end of the glass tubes 54 and 64 and has mounted therein a cable 72 for connecting the half cells 58 and 68 to a pH meter, not shown. The lower end of the glass tube 64 is sealed to the glass stem 54 of the sensing electrode by means of an annular silicone rubber plug 74. It is conventional practice in combination electrodes of the type shown in FIG. 3 that the leak structure for the reference portion of the electrode, namely the liquid flow path provided between the salt solution 66 and the sample solution, be provided by a thread disposed between the wall of the plug 74 and the glass tube 64. However, in accordance with the present invention a diffusion barrier, rather than a leak path is provided by clamping an annular semi-permeable membrane between the plug and one or both of the glass walls 54 or 64, two of such membranes 76 and 77 being illustrated in FIG. 3.

Although several embodiments of the invention have been disclosed herein for purposes of illustration, it will be understood that various changes can be made in the form, details, arrangement and proportions of the various parts in such embodiments without departing from the spirit and scope of the invention as defined by the appended claims. It is to be further understood that in the appended claims, the term "electrochemical electrode assembly" refers both to reference electrodes used in measuring ionic concentrations of solutions and to biological electrodes for meausuring D.C. potentials of body fluids.

What is claimed is:

1. An electrochemical electrode assembly comprising:
   a tube formed of nonconductive material adapted to hold an electrolyte, said tube having an open end;
   an internal half cell positioned in said tube for contacting said electrolyte;
   a flexible sleeve having one end mounted on said open end of said tube in sealing relationship therewith;
   a ball of nonconductive material closing the other end of said sleeve; and a semi-permeable membrane disposed over said ball with the membrane being clamped between said sleeve and said ball.

2. An electrochemical electrode assembly comprising:
a reference electrode having a leak structure end;
an elongated tube of nonconductive material having one end mounted on said end of said reference electrode in sealing relationship therewith, the major portion of said tube including the other end thereof being flexible thereby providing a readily movable salt bridge for said reference electrode;
a ball of nonconductive material closing said other end of said tube; and
a semi-permeable membrane disposed over said ball with the membrane being clamped between said tube and said ball.

References Cited

UNITED STATES PATENTS

| | | | |
|---|---|---|---|
| 2,846,386 | 8/1958 | Ingruber | 204—195 |
| 2,288,180 | 6/1942 | Brengman et al. | 204—195 |
| 2,760,922 | 8/1956 | Williams | 204—195 |
| 2,925,370 | 2/1960 | Rohrer | 204—195 |
| 3,065,151 | 11/1962 | Schaschl et al. | 204—1.1 |
| 3,103,480 | 9/1963 | Watanabe et al. | 204—195.1 |
| 3,264,205 | 8/1966 | Leonard et al. | 204—195 |

OTHER REFERENCES

Jour. of the Am. Chem. Soc., vol. 86, May 1964, pp. 1901–2.

Jour. of the Electrochemical Soc., vol. 106, No. 4, 1959, pp. 347–354.

T. TUNG, Primary Examiner